United States Patent [19]

Greynolds et al.

[11] 4,380,183
[45] Apr. 19, 1983

[54] PLASTICS TRIM PRESS SHEET FEEDING MECHANISMS

[75] Inventors: Fred L. Greynolds, Beaverton; Robert C. Whiteside, Harrison; Doyle D. Durkee, Beaverton, all of Mich.

[73] Assignee: Leesona Corporation, Beaverton, Mich.

[21] Appl. No.: 265,572

[22] Filed: May 20, 1981

[51] Int. Cl.³ .................. B26F 1/40; B65H 17/36; B65H 17/40
[52] U.S. Cl. ............................... 83/244; 83/241; 83/278; 83/282
[58] Field of Search ............... 83/244, 241, 278, 282

[56] References Cited

U.S. PATENT DOCUMENTS

| | | | |
|---|---|---|---|
| 3,388,625 | 6/1968 | O'Brien et al. | 83/278 X |
| 3,461,760 | 8/1969 | White | 83/97 X |
| 4,005,626 | 2/1977 | Bateman et al. | 83/278 X |
| 4,173,161 | 11/1979 | Arends et al. | 83/278 |
| 4,306,474 | 12/1981 | Arends et al. | 83/50 |

Primary Examiner—Frank T. Yost
Attorney, Agent, or Firm—Learman & McCulloch

[57] ABSTRACT

A trim press is provided with a remotely controlled adjustment by means of which the end limit of the feeding stroke of the feeding mechanism may be precisely adjusted relative to the die of the trim press while the machine is in operation. Oscillating and reciprocating members of the prior art trim presses are replaced by continuously rotating members to enable a higher rate of operation.

21 Claims, 9 Drawing Figures

PLASTICS TRIM PRESS SHEET FEEDING MECHANISMS

BACKGROUND OF THE INVENTION

The present invention is especially related to improved feeding mechanisms for trim presses of the general type shown in U.S. Pat. Nos. 4,173,161 and a commonly owned copending application Ser. No. 06/145,899, filed May 2, 1980, now U.S. Pat. No. 4,306,474, which are incorporated herein by reference. These types of presses are employed to trim or sever articles from a sheet of thermoplastic material in which the articles have been integrally formed, generally in uniformly spaced rows. The trimming operation is performed by a cyclically reciprocated die and the feeding mechanism of the machine is operable to feed the sheet with the integrally formed articles to the die in step-by-step movement synchronized with the die reciprocation. Such sheets are usually formed with uniformly spaced projecting feed tabs which are engaged by the reciprocating feed fingers of the feed mechanism to advance the sheet one step toward the die on each feeding stroke of the feeding fingers.

Because the feed fingers must be located somewhat upstream of the feed path from the die assembly, accurate trimming of the articles from the sheet by the die is dependent upon precisely locating the end limit of the feeding stroke of the feed fingers relative to the die so that, at the conclusion of a feeding stroke, the row of articles to be trimmed is precisely aligned with the die.

While presently commercially available feed mechanisms are conventionally provided with adjustable elements to vary the location of the end of the feeding stroke of the feed fingers relative to the die, these adjustments almost invariably are of a nature such that it is necessary to make the adjustments while the various parts of the machine are stationary. This frequently requires a time-consuming trial and error process in which an initial adjustment is made, the machine is placed in operation, then shut down and readjusted, and the cycle repeated until inspection of the trimmed parts shows that alignment has been achieved.

Because the prior art mechanisms conventionally employ a substantial number of reciprocating and oscillating parts, a practical upper limit on the production rate of such machines is imposed. Each reciprocating or oscillating part must cyclically reverse direction which requires that the part be decelerated as it approaches one end of the stroke and then accelerated as it leaves the point of stroke reversal. The impact type loading imposed by such stroke reversals increases rapidly as the frequency of reversal increases, forcing the machine designer to compromise between a desired production rate and a desired degree of rigidity of the individual parts of the machine.

The present invention is especially directed to a solution of these two latter problems, and provides a machine in which the feeding stroke may be precisely located relative to the die while the machine is in operation, and by an arrangement wherein many oscillating or reciprocating parts are replaced by continuously rotating members.

SUMMARY OF THE INVENTION

In accordance with the present invention, reciprocating slide blocks upon which the feed fingers of the apparatus are carried are driven in reciprocation by links which are coupled to a flywheel-like drive assembly which is continuously driven in rotation to reciprocate the feed fingers. In a preferred embodiment, drive discs are mounted upon a shaft which is in turn rotatably supported within housings which are in turn mounted for rotary movement within the fixed frame of the machine. The axis of rotation of the disc shaft is eccentrically disposed within the housings with respect to the axis about which the housings may be rotated in the machine frame. By rotating the housings within the machine frame, the axis of rotation of the drive discs may be raised or lowered relative to the machine frame while the discs are rotated. Raising and lowering of the shaft axis causes a corresponding raising and lowering of the path of movement of the feed fingers relative to the machine frame, and hence to the die. This particular adjustment can be made while the machine is running and represents a fine adjustment of the location of the end of the feeding stroke of the feed fingers relative to the die.

The previously mentioned link which couples the feed finger carrying slide blocks to the drive discs is also, in the embodiment disclosed, adjustable in length to provide a coarse adjustment of the lower end limit of movement of the feed fingers, while the drive discs are provided with a plurality of link pivot receiving openings so that the links may be coupled to the drive discs at any of several locations to establish the amplitude of the feeding stroke of the feed fingers. These latter two adjustments must be made while the machine is stationary.

The foregoing arrangement relies upon the rotary disc mechanism to drive the reciprocating feed mechanism, thus replacing the oscillating link structure employed in prior art devices such as the aforementioned U.S. Pat. No. 4,173,161 and application Ser. No. 06/145,899. This enables a higher production rate to be achieved in that the number of oscillating or reciprocating parts is substantially reduced as compared to prior art devices. Other objects and features of the invention will become apparent by reference to the following specification and to the drawings.

IN THE DRAWINGS

Figure 1:
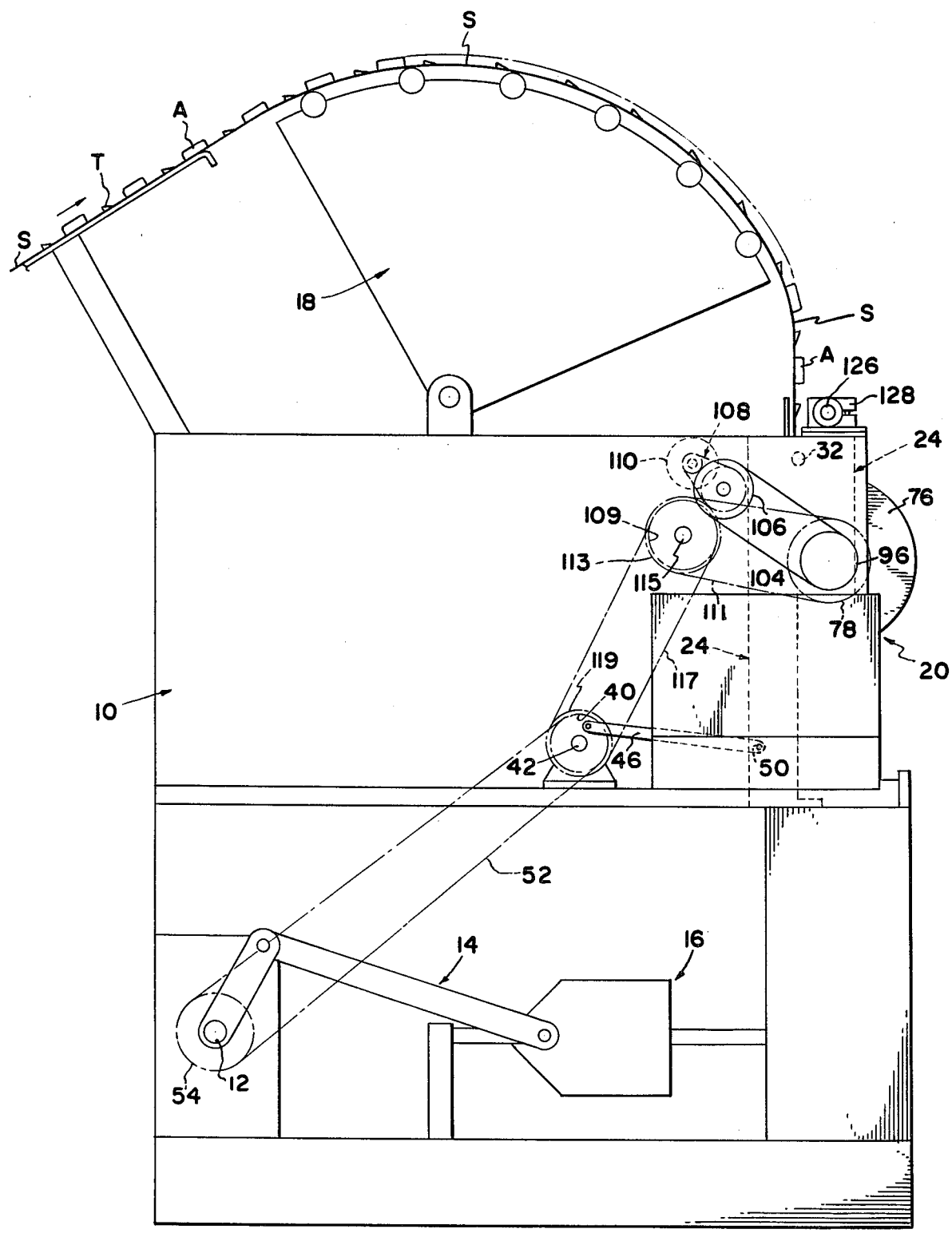
FIG. 1 is a simplified, somewhat schematic, side elevational view of a trim press embodying the present invention.

Referring first to FIG. 1, there is shown a simplified side elevational view of a trim press embodying the present invention. The press includes a fixed frame designated generally 10 within which is journaled a rotary main drive shaft 12 which, when driven in rotation, acts through a linkage designated generally 14 to drive a die member designated generally 16 in horizontal reciprocation. The die 16 acts to sever or trim cup-shaped articles A which have been integrally formed in uniformly spaced succession in a sheet or web S of thermoplastic material proceeding from a thermoforming machine which differential pressure molds the articles A in the sheet in spaced rows. The sheet S with the integrally formed articles is guided into the machine over an oscillating canopy (see application No. 06/145,899) designated generally 18 and passes generally vertically downwardly from the righthand end of the canopy as viewed in FIG. 1 though a feed mechanism designated generally 20. Feed mechanism 20 advances the sheet S in step-by-step movement synchronized with the reciprocation of the die 16 to align successive articles on the sheet with the die for the severing operation. To accomplish the feeding operation, the sheet S is formed with uniformly spaced projecting feed tabs T which are engaged by elements of feed mechanism 20, to be described hereinafter, to advance the sheet to the die in the desired step-by-step or incremental movement.

The overall organization of the machine described thus far is generally similar in function and operation to the trim presses described in U.S. Pat. No. 4,173,161 and application Ser. No. 06/145,899, to which reference may be had for further details of the die and canopy operation. The present invention is specifically concerned with an improved feeding mechanism 20 which is operable at higher speeds and with greater precision than presently available feeding mechanisms.

Figure 2:
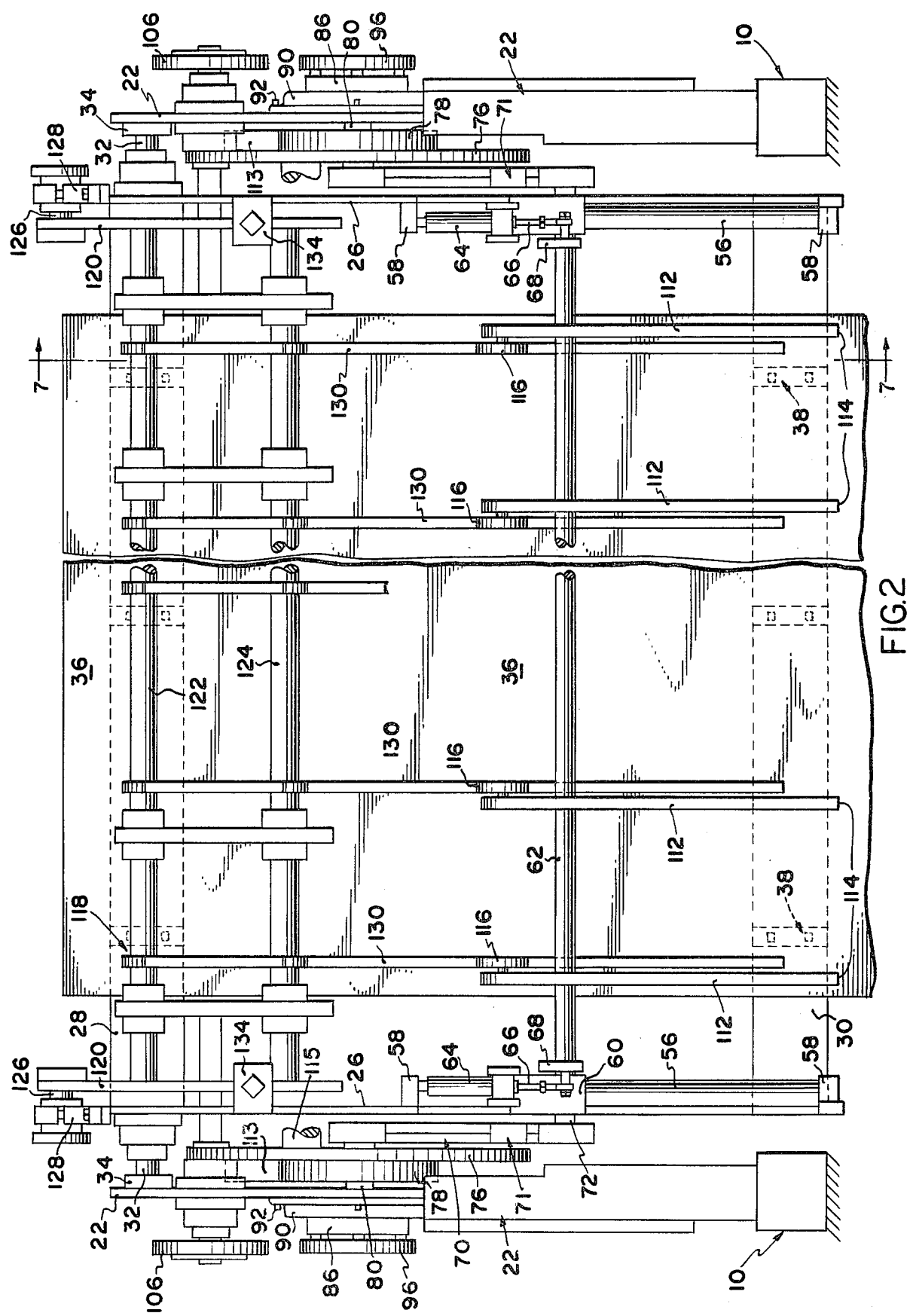
FIG. 2 is an enlarged front end view of the feeding mechanism of the machine of FIG. 1.
Figure 3:
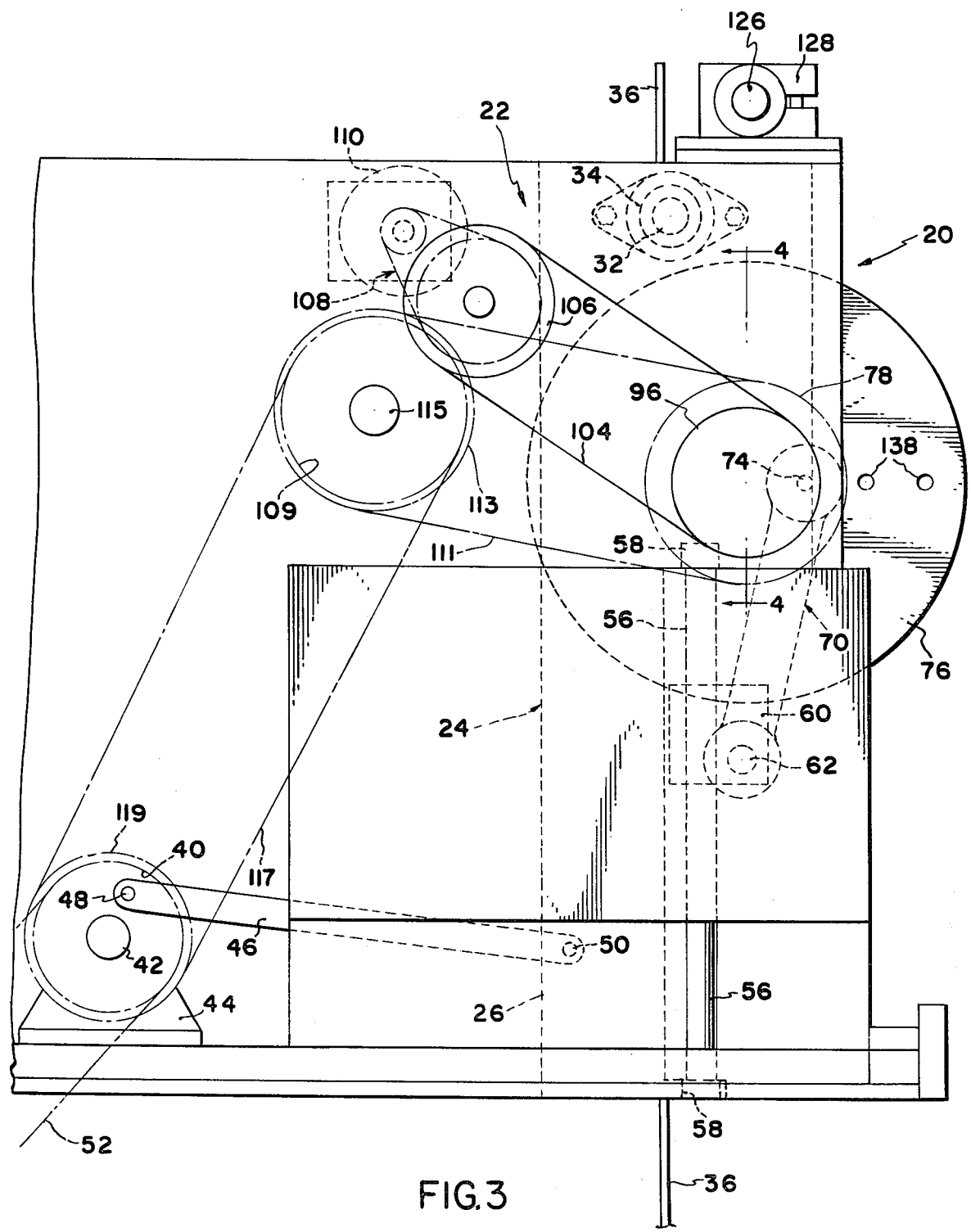
FIG. 3 is a side elevational view of the feed mechanism illustrated in FIG. 2.
Figure 6:
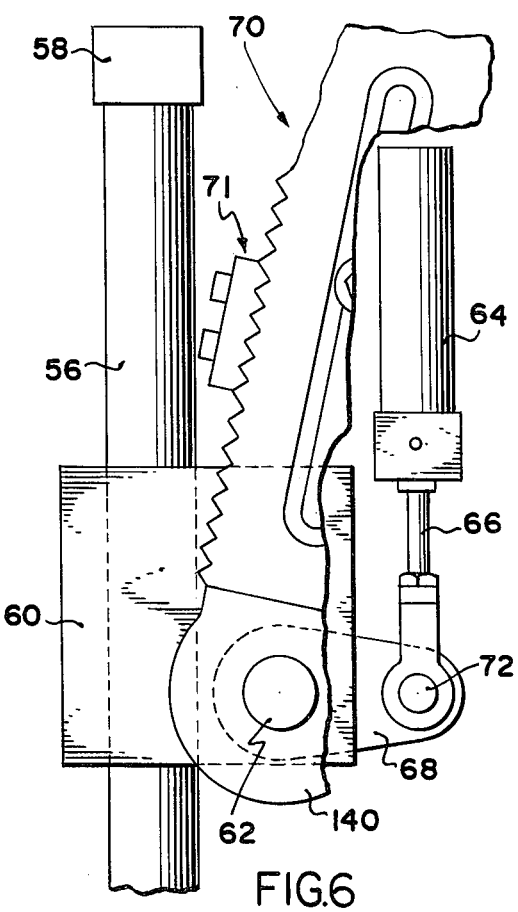
FIG. 6 is an enlarged side elevational view of a portion of the feed mechanism, with certain parts omitted, broken away, or shown in section.

Referring now particularly to FIGS. 2, 3, and 6, the feed mechanism 20 includes a pair of spaced, parallel, vertically extending side frame members 22 which are fixedly mounted upon press frame 10. A treadle frame (shown per se in FIG. 7) designated generally 24, is disposed between the two opposed stationary side frame members 22 and includes a pair of opposed side plates 26 which are fixedly secured to each other by upper and lower I beams 28 and 30 respectively to form a rigid generally rectangular frame as viewed in FIG. 2. Treadle frame 24 is pivotally supported near its upper end from stationary side frame members 22 by stub shafts 32 rotatably journaled in side frame members 22 as at 34. A guide plate 36 of generally rectangular configuration is fixedly mounted to the I beam members of the treadle frame as by bolt and spacer assemblies designated generally 38. Plate 36 provides a flat surface along which the flat side of sheet S slides as it moves through the mechanism 20.

Referring now particularly to FIGS. 1 and 3, a pair of drive pulleys 40 (one aligned with each treadle frame side plate 26) are fixedly mounted upon a rotary shaft 42 which in turn is mounted for rotation as by pillow blocks 44 upon the press frame 10. A link 46 is pivotally coupled at one end as at 48 to drive pulley 40 and is pivotally coupled at its opposite end as at 50 to the treadle frame side plate 26 so that rotation of pulley 40 will cause treadle frame 24 to swing in pivotal oscillation about its mounting pivot 32. Drive pulley 40 is driven in rotation by a belt 52 which is in turn driven by a drive pulley 54 on the main press drive shaft 12 (FIG. 1). Each of the two treadle frame side plates 26 is coupled by a link 46 to a drive pulley 40, the shaft 42 extending the width of the feed mechanism 20. Because the treadle frame 24 is driven in pivotal oscillation from the same drive shaft 12 as drives the die mechanism 16, it is believed apparent that the pivotal oscillation of treadle frame 24 is synchronized with the reciprocation of die 16.

Figure 5:
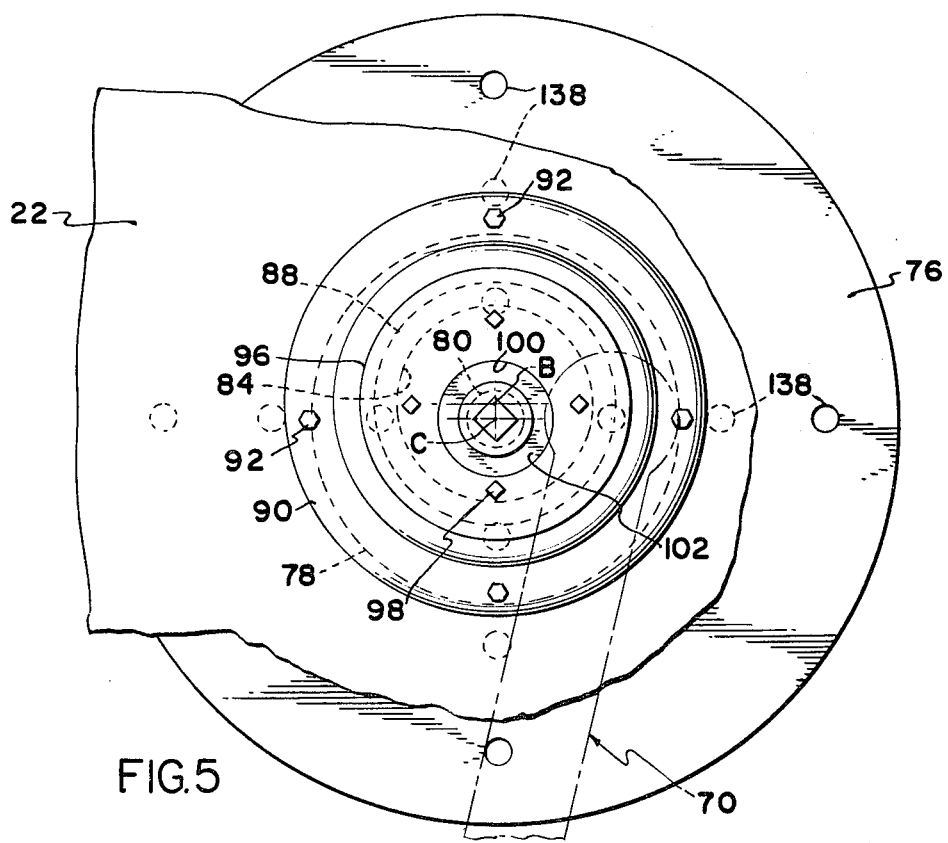
FIG. 5 is a detail end view of the mechanism of FIG. 4 with certain parts broken away.

Referring now particularly to FIGS. 2, 3, and 5, it is seen that each treadle frame side plate 26 carries a guide rod 56 which is fixedly mounted upon side plate 26 as by pads 58 (FIG. 2). A slide block 60 is slidably received upon each guide rod 56 and a transversely extending feed finger support shaft 62 extends between and passes through the respective slide blocks 60, the shaft 62 being rotatably journaled within slide blocks 60. Each slide block 60 pivotally mounts a small fluid pressure operated motor 64 whose piston rod 66 is pivotally coupled to a crank 68 fixedly secured to shaft 62, whereby extension or retraction of piston rod 66 acts to locate the shaft 62 at either of two rotary end limits of movement relative to slide blocks 60.

Slide blocks 60 are driven in reciprocating movement along their respective guide rods 56 by a disc-driven drive link mechanism duplicated for each of the two slide blocks. This mechanism includes a link 70 whose lower end pivotally receives the end portion 72 of shaft 62 which projects beyond the respective slide block. Link 70 preferably is provided with means designated generally at 71 which enable an adjustment of the length of the link, details of which will be described hereinafter in connection with the operational description. The opposite end of link 70 is pivotally mounted as by a pivot assembly 74 to a selected location (to be described in connection with the description of the operation) a drive disc 76 which has a drive pulley 78 of reduced diameter fixedly secured to the opposite face of the disc. Disc 76 and drive pulley 78 carry a fixedly mounted coaxial shaft 80 (FIG. 2) which is in turn rotatably supported in the adjacent stationary frame member 22 of the mechanism by an adjustable eccentric support assembly designated generally 82. Details of this adjustable mounting 82 are best shown in FIG. 4.

Figure 4:
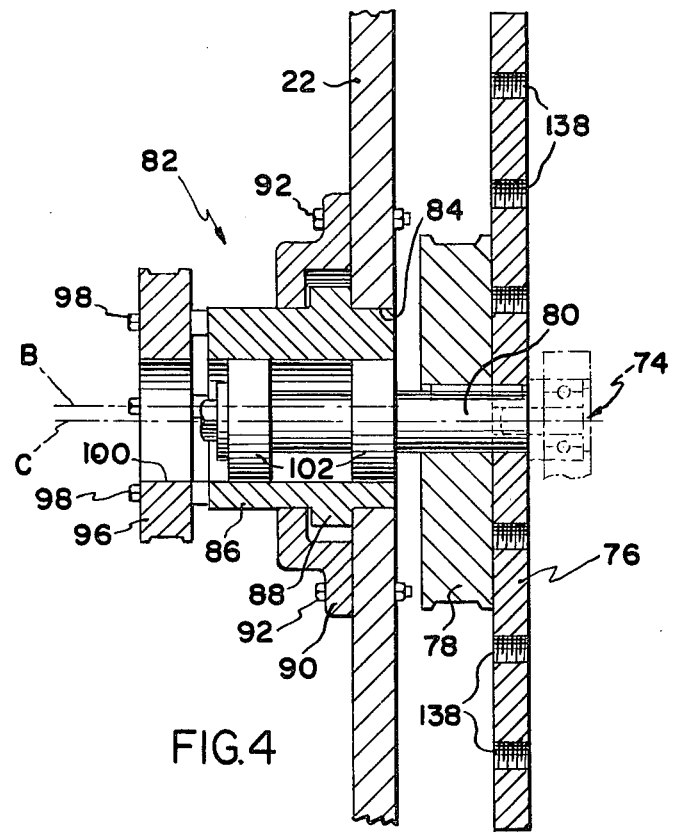
FIG. 4 is a detail cross-sectional view taken on the line 4—4 of FIG. 3.

Referring to FIGS. 4 and 5, it is seen that the stationary frame member 22 has a circular opening 84 which rotatably receives a cylindrical housing 86. An integral annular flange 88 upon housing 86 is rotatably received between the outer face of frame member 22 and an annular cap 90 secured to frame member 22 as by bolts 92. Member 86 is free to rotate within bore 84 and cap 90 about the axis B indicated in FIG. 4.

A drive pulley 96 is fixedly mounted upon the end of member 86 in coaxial relationship with axis B as by bolts 98. An eccentric bore 100 passes through both drive pulley 96 and member 86, the central axis of bore 100 being indicated at C. The shaft 80 of disc 76 and its drive pulley 78 is rotatably mounted within the eccentric bore 100 as by bearings 102, the axis of rotation of shaft 80 being coaxial with bore axis C. By adjusting the rotary position of member 86 about its axis B, the position of the axis C of shaft 80 relative to the stationary frame member 22 may be raised and lowered between end limits determined by the amount of eccentricity between the axes B and C. This adjustment capability is employed to adjust the elevation of axis C for reasons to be described below.

Rotary adjustment of member 86, and the consequent vertical adjustment of axis C relative to the stationary frame, is accomplished by remote control and can be performed while the feed mechanism is in operation.

Referring to FIG. 1, it is seen that drive pulley 96 is coupled by an endless belt 104 to a second drive pulley 106 rotatably mounted on stationary frame member 22 and in turn coupled by a second belt and pulley system designated generally 108 to a reversible electric drive motor 110. Actuation of motor 110, as by a manually actuated control switch, is employed to rotate drive pulley 96 and hence the eccentric shaft mounting housing 86 through a desired angle.

Referring now particularly to FIGS. 1 and 2, disc 76 is driven in rotation as by a belt 111 trained around drive pulley 78 and another pulley 113 fixedly mounted on a shaft 115. Shaft 115 extends between the two opposed stationary side frame members 22, and supports a pulley 113 adjacent each of the inner sides of the two frame members 22. A centrally located pulley 109 on shaft 115 is coupled by a drive belt 117 to a pulley 119, mounted upon and rotatable with shaft 42 which, as will be recalled, drives treadle frame 24 in pivotal oscillation. Thus, rotation of disc 76, and hence the vertical reciprocation of slide blocks 60, is synchronized with the pivotal oscillation of treadle frame 24, since the drive for both is derived from shaft 42, whose rotation in turn is derived from rotation of the main drive shaft 12 of the trim press.

Figure 7:
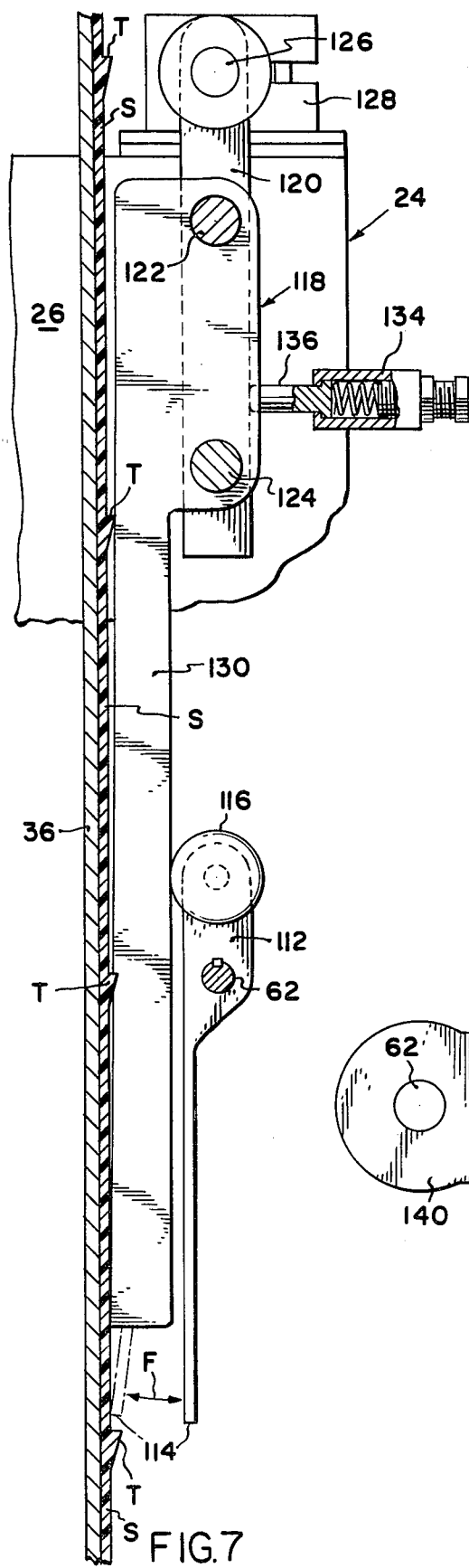
FIG. 7 is an enlarged, fragmentary, cross-sectional view, with certain parts broken away, taken on the line 7—7 of FIG. 2.

Details of the feed finger and sheet clamping assembly are best seen in FIGS. 2 and 7, FIG. 7 being a side view of the treadle frame 24 per se. Feed fingers 112 are non-rotatably mounted on shaft 62, by suitable means, not shown, which will accommodate adjustment of the fingers 112 axially of shaft 62 while maintaining the fingers locked against rotation relative to the shaft. Fingers 112 are located axially of the shaft 62 to be aligned with the path of movement of the feed tabs T (FIG. 7) of the sheet of material being fed through the mechanism. The tip 114 of each feed finger 112 is squared off or otherwise formed to drivingly engage the feed tab T, each tip 114 being swung into and out of engagement with the sheet along the arc indicated at F in FIG. 7 by pivotal oscillation of shaft 62 about its axis. Each feed finger carries a clamp-engaging roller 116 at its upper end.

Referring now particularly to FIG. 7, a sheet clamping frame 118 includes a pair of side frame members 120 which are rigidly interconnected to each other by a pair of transversely extending rods 122, 124. Stub shafts 126 at the upper end of each side frame member 120 pivotally support the frame defined by the side frame members 120 and shafts 122, 124 in pivotal mountings 128 fixedly mounted upon the upper ends of the respective side plates 26 of treadle frame 24. Two or more clamping fingers 130 are slidably received on the rods 122, 124 and lock at selected positions of axial adjustment along the rods by any suitable means, such as set screws. Adjustable spring pin assemblies 134 are fixedly mounted upon the respective treadle frame side plates 26 and include a spring biased pin 136 (FIG. 7) which bears against the clamping frame side plates 120 to resiliently urge the clamping fingers 130 toward the sheet S to lightly press the sheet against backing plate 36 of treadle frame 24.

As best seen in FIG. 7, the inclination of clamping fingers 130 relative to sheet S and the relatively light spring bias applied by the spring pin assemblies 134 does not essentially interfere or resist the downward movement of sheet S in the feeding direction as viewed in FIG. 7. However, when the feed finger carrying shaft 62 is rotated to a position where the tips 114 of the feed fingers are clear of the feed tabs T on the sheet, the rollers 116 bear against clamping fingers 130 to firmly press the clamping fingers against the sheet S to clamp the sheet against backing plate 36. This clamping action is employed during the return or upward stroke of the feed fingers, rollers 116 rolling along the inclined surface of the clamping fingers 130 as shaft 62 is moved upwardly, to firmly clamp the sheet against retrograde or upward movement between successive feeding steps, while the die is trimming articles from the sheet S.

OPERATION

In operation, the main drive shaft 12 of the trim press (FIG. 1) is driven in rotation by a suitable drive motor, not shown, and linkage 14 drives the die member 16 in horizontal reciprocation, the die punching one row of articles from the sheet S at the forward end of its feeding stroke to the right as viewed in FIG. 1.

As previously explained, the main drive shaft 12 is coupled by a belt and pulley arrangement including belt 52 to a pulley on shaft 42, the shaft having additional pulleys 40 at each end which, through links 46, are coupled to treadle frame 24 to pivotally oscillate treadle frame 24 about its mounting pivots 32 as the drive members 40 are driven in rotation with shaft 42.

Referring now particularly to FIG. 3, drive pulleys 40 are connected by belts 117 to pulleys 109 which are in turn connected by drive belts 111 to a pulley 78 which is fixedly mounted upon each drive disc 76. Each drive disc 76 is in turn connected by a link 70 to shaft 62, mounted upon slide blocks 60 which are in turn slidably mounted upon guide rods 56 on treadle frame 24. Thus, rotation of discs 76 cause links 70 to drive slide blocks 60 in generally vertical reciprocation along guide rods 56, the actual direction of reciprocation being generally radial of the treadle frame mounting pivots 32. Thus, referring now to FIG. 7, shaft 62 is reciprocated along a path parallel to the surface of the backing plate 36 so that the feed fingers 112 upon completion of a downwardly directing feeding stroke are then vertically elevated to a position slightly above the next feed tab T on sheet S.

During this reciprocation of shaft 62, the tips 114 of the feeding fingers are cyclically actuated into and out of alignment with the feed tabs T by pivotal oscillation of shaft 62 which is accomplished by actuation of fluid motors 64 (FIG. 6), which by extending and retracting piston rods 66 cause cranks 68 to pivotally oscillate shaft 62. Actuation of motors 64 is in turn controlled by a cyclically actuated controller actuated by rotation of main drive shaft 12.

The length of the feeding stroke—that is the amplitude of reciprocation of slide blocks 60 is determined by the initial machine set up in which the location of the pivotal connection between each link 70 and disc 76 is selected by mounting pivots 74 in any one of several spaced mounting holes 138 (FIGS. 3 and 5) in drive discs 76. The radial distance of the particular opening 138 selected from the axis of rotation of discs 76 effectively establishes the amplitude of reciprocation of the slide blocks 60.

Figure 8:
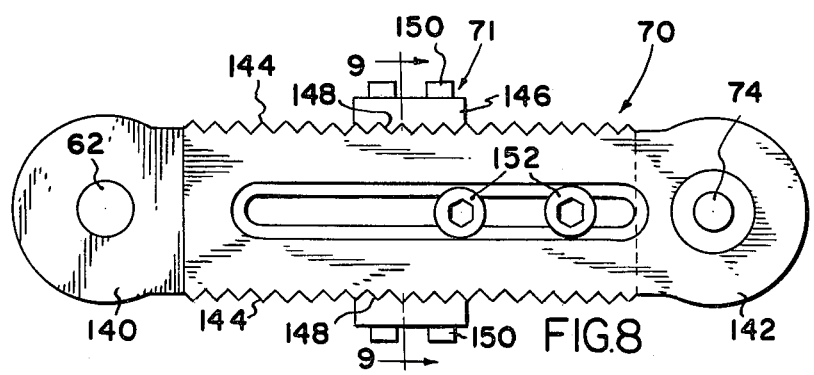
FIG. 8 is a side elevational view of an adjustable link employed in the feed mechanism.
Figure 9:
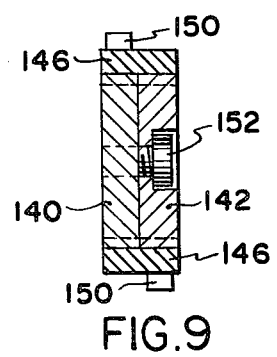
FIG. 9 is a detail cross-sectional view taken on the line 9—9 of FIG. 8.

A coarse adjustment of the location of the upper (and lower) end limits of this reciprocatory stroke of slide blocks 60 relative to guide rods 56 is accomplished by appropriate adjustment of the length of links 70 by the adjustments 71 on the link. One type of adjustment arrangement is shown in FIGS. 8 and 9. Each link 70 is constructed in two parts 140, 142, each having a series of saw teeth 144 extending along a portion of its edges. A pair of blocks 146 having mating saw teeth 148 are mounted, one on each link part, by machine screws 150. When the blocks 146 are tightly clamped to their respective link parts, the teeth 148 on each block seat between teeth 144 of both link parts to establish a selected link length. Clamp screws 152 pass through a slot in link part 142 and are threaded into link part 140.

The two adjustments described thus far both must be made while the various parts of the feeding mechanism are stationary. The amplitude of the stroke of slide blocks 60 is quite easily determined in that this is dictated by the spacing between the feed tabs T on the article carrying sheet, these tabs in turn being spaced from each other by a distance directly related to the spacing between the successive articles A formed in the sheet.

Essentially, the distance between successive articles A upon the sheet establishes the distance which the sheet must be fed by each feeding stroke of the feed mechanism, and the amplitude of the feeding stroke— that is the amplitude of vertical reciprocation of slide blocks 60 is selected to exceed this distance by at least a small amount so that the feed fingers will pivot into engagement with the sheet slightly above a row of feeding tabs T and engage the tabs to drive the sheet downwardly at some point during its forward stroke. This is easily accomplished by simply selecting the appropriate openings 138 in feed discs 76 to mount the link pivots 74.

The critical adjustment thus is accurately establishing the lower end limit of the feed stroke, to be assured that at the completion of the downward feeding stroke, a row of articles A is accurately aligned with the die mechanism 16. As previously stated, a coarse adjustment of the location of the lower end limit of feeding stroke can be performed by the adjustment of the length of the links 70 by adjustments 71. However, in order to be certain that both links 70 are set to precisely the same length, the link length adjustment is necessarily a step-by-step adjustment, and must be made while the machine is stationary.

The final fine adjustment of the location of the lower end limit of the feeding stroke is determined by the eccentric mounting assembly 82 best shown in FIGS. 4 and 5. As previously described, by rotating housing members 86 within their mounting on the stationary frame member 22, the elevation of the axis of rotation C of drive disc shaft 80 can be changed relative to the fixed frame 22. Since drive shaft 80 will thus raise or lower drive discs 76, coupled by links 70 to the finger carrying shaft 62, raising and lowering of shaft 80 will cause a corresponding raising or lowering of the lower end limit of reciprocation of shaft 62, and hence the feed fingers 112 carried upon the shaft. The range of adjustment of the axis C relative to frame 22 is at least slightly greater than the spacing of the teeth 144 on links 70 and is continuous over that range.

Adjustment of the elevation of the axis of rotation C of the disc carrying shaft 80 can be accomplished while the feed mechanism is in operation. The sole support for shaft 80 is found in the bearings 102 which rotatably support these two shafts within the housings 86, and shifting of housings 86 relative the fixed frame 22 can take place while shaft 80 is rotating.

This adjustment is accomplished by manually energizing the electric motor 110 which, via the belt and pulley connections will drive pulleys 96, which are fixed to members 86, in rotation. Motor 110 is a relatively low speed reversible electric motor, and the shaft output of motor 110 is further reduced by the belt and pulley system coupled between the motor shaft and pulleys 96. Conventionally, the adjustment by this particular means is made while the machine is in operation and its accuracy is checked by inspecting the trimmed articles.

In addition to the precise adjustment of the positioning of the articles relative to the die described above, the arrangement disclosed relies largely on belt and pulley drives, with a minimum number of reciprocating parts whose motion must be first decelerated, then reversed and accelerated during the cyclic operation of the mechanism. By the substantial reduction of the number of reciprocating parts as compared to prior machines, higher rates of operation may be achieved.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

What is claimed is:

1. In a trim press for trimming articles integrally formed in uniformly spaced succession in a sheet of thermoplastic material from said sheet, said press comprising a frame, cyclically actuated die means for trimming said articles from said sheet, said sheet having uniformly spaced feed tabs thereon, and cyclically operable feed means engageable with said tabs for feeding said sheet in step-by-step movement to said die means in synchronism with the actuation of said die means; the improvement wherein said feed means comprises treadle means mounted adjacent its upper end upon said frame for pivotal movement about a first horizontal axis, slide means mounted on said treadle means adjacent the lower end thereof for reciprocation along a first path normal to said first axis, feed finger means mounted on said slide means, a first rotary member, mounting means mounting said first rotary member on said frame for rotation about a second axis parallel to said first axis, first link means pivotally connected at one end to said first rotary member at a location offset from said second axis and pivotally connected at its opposite end to said slide means to cyclically reciprocate said slide means along said first path in response to rotation of said first rotary member, a second rotary member mounted on said frame for rotation about a third axis parallel to said first axis, second link means pivotally connected at one end to said second rotary member at a location offset from said third axis and pivotally connected at its opposite end to said treadle means adjacent the lower end thereof for pivotally oscillating said treadle means about said first axis upon rotation of said second rotary member, and first drive means for driving said first and second rotary members in continuous rotation synchronized with the actuation of said die means.

2. The invention defined in claim 1 wherein said mounting means comprises means for adjustably locating said second axis at selected positions relative to said frame.

3. The invention defined in claim 1 wherein said mounting means comprises a third rotary member mounted in said frame for rotation about a fourth axis parallel to and offset from said first axis, said first rotary member being rotatably mounted in said third rotary member, and means for locating said third rotary member in selected positions of rotary adjustment about said fourth axis.

4. The invention defined in claim 3 wherein said means for locating said third rotary member comprises adjusting means for rotating said third rotary member about said fourth axis to a new rotary location while said first rotary member is being driven in rotation about said second axis.

5. The invention defined in claim 4 wherein said adjusting means comprises second drive means operable independently of said first drive means for driving said third rotary member in selected increments of rotation.

6. The invention defined in claim 1 wherein said first rotary member comprises a disc, and means for selectively pivotally connecting said one end of said first link means to said disc at any of a plurality of locations spaced at different radial distances from said second axis.

7. The invention defined in claim 6 further comprising means for selectively adjusting the length of said first link means.

8. The invention defined in claim 7 further comprising means for adjustably shifting the location of said second axis relative to said frame while said disc is being driven in rotation about said second axis.

9. The invention defined in claim 1 wherein said feed means comprises a feed finger mounted on said slide means for pivotal movement about a fifth axis parallel to said first axis, means on said slide member for pivoting said feed finger between a feeding position engageable with the feed tabs on said sheet, and a retracted position clear of the path of movement of said tabs, and clamp means mounted on said treadle means operable in response to movement of said feed finger to said retracted position for clamping said sheet.

10. The invention defined in claim 9 wherein said clamp means comprises a clamp frame pivotally mounted at its upper end on the upper end of said treadle means, clamp finger means on said clamp frame means engageable with said sheet, and means on said feed finger engaged with said clamp finger for pressing said clamp finger against said sheet upon movement of said feed finger to said retracted position.

11. In a trim press for trimming articles integrally formed in uniformly spaced succession in a sheet of thermoplastic material from the sheet, said press comprising a frame, cyclically actuated die means on said frame for trimming articles from said sheet, said sheet having uniformly spaced feed tabs thereon, and cyclically actuated feed means engageable with said tabs for feeding said sheet in step-by-step movement along a feed path to said die means in synchronism with the actuation of said die means; the improvement wherein said feed means comprises treadle means, feed finger means mounted on said treadle means for reciprocation parallel to said feed path, a first rotary member mounted on said frame for rotation about a first axis, link means pivotally connected at one end by a first pivot means to said rotary member and pivotally connected at its opposite end by a second pivot means to said feed finger means to drive said feed finger means in reciprocation upon rotation of said rotary member, drive means for driving said rotary member in continuous unidirectional rotation, and adjustment means for adjusting the location of said first axis relative to said frame while said rotary member is driven in rotation by said drive means to thereby adjust the location of one end limit of the reciprocatory stroke of said feed finger means relative to said die means.

12. The invention defined in claim 11 further comprising first means for mounting said first pivot means at any of a plurality of locations respectively spaced at different radial distances from said first axis to thereby selectively establish the amplitude of the reciprocatory stroke of said feed finger means.

13. The invention defined in claim 11 further comprising second means for adjusting the length of said link means to adjustably locate the one end limit of the reciprocatory stroke of said feed finger means with respect to said first axis.

14. The invention defined in claim 13 wherein said second means is operable to adjust the length of the link means in step-by-step increments and said adjustment means is operable to adjust the location of said first axis relative to said frame continuously over a range at least equal to the increment of adjustment of the link means.

15. The invention defined in claim 11 wherein said adjustment means comprises a shaft on said rotary member defining first axis, a housing rotatably supporting said shaft for rotation about said first axis, and means mounting said housing in said frame for rotation relative to said frame about a second axis parallel to and offset from said first axis.

16. The invention defined in claim 15 further comprising remote controlled, reversible power driven means for rotating said housing relative to said frame about said second axis.

17. In a trim press for trimming articles integrally formed in uniformly spaced succession in a sheet of thermoplastic material from said sheet, said press comprising a frame, cyclically actuated die means for trimming said articles from said sheet, and cyclically operable feed means engageable with said sheet for feeding said sheet in step-by-step path of movement to said die means in synchronism with the actuation of said die means; said feed means including cyclically operable treadle means mounted upon said frame for movement in an oscillating path generally normal to the sheet feed path, and feed finger means mounted on said treadle means; the improvement wherein a rotary member is provided, and mounting means mounts said rotary member on said frame for rotation about an axis, link means is connected at one end to said first rotary member at a location offset from said axis and is connected at its opposite end to said feed finger means to cyclically reciprocate said feed finger means in response to rotation of said rotary member; drive transmission means is connected to said treadle means for oscillating said treadle means; and drive means for driving said rotary member in continuous rotation, and driving said drive transmission means for said treadle means, both in synchronization with the actuation of said die means.

18. The invention defined in claim 17 wherein said rotary member comprises a disc, and means for selectively pivotally connecting said one end of said link means to said disc at any of a plurality of locations spaced at different radial distances from said axis.

19. The invention defined in claim 18 further comprising means for adjustably shifting the location of said axis relative to said frame while said disc is being driven in rotation about said axis.

20. In a trim press for trimming articles integrally formed in uniformly spaced succession in a sheet of thermoplastic material from said sheet, said press comprising a frame, cyclically actuated die means for trimming said articles from said sheet, and cyclically operable feed means engageable with said sheet for feeding said sheet in step-by-step path of movement to said die means in synchronism with the actuation of said die means; said feed means including cyclically operable treadle means mounted upon said frame for movement in an oscillating path generally normal to the sheet feed path, and feed finger means mounted on said treadle means; a drive member connected to said feed finger means to cyclically reciprocate said feed finger means in response to rotation of said drive member; drive transmission means connected to said treadle means for oscillating said treadle means; means for driving said drive member and said drive transmission means for said treadle means in synchronization with the actuation of said die means; said feed finger means comprising feed fingers mounted for pivotal movement, means on said treadle means for pivoting said feed fingers between a feeding position engageable with the feed tabs on said sheet, and a retracted position clear of the path of movement of said tabs; and clamp means mounted on said treadle means operable in response to movement of said feed fingers to said retracted position for clamping said sheet.

21. The invention defined in claim 20 wherein said clamp means comprises a clamp frame pivotally mounted on the treadle means, clamp finger means on said clamp frame means normally lightly engaged with said sheet, and roller means on said feed finger means engageable with said clamp finger means for locking said clamp finger means against said sheet upon movement of said feed finger means to said retracted position.

* * * * *